United States Patent
Ulman et al.

(10) Patent No.: US 8,902,413 B2
(45) Date of Patent: Dec. 2, 2014

(54) CELL PHONE NDVI SENSOR

(71) Applicants: Morrison Ulman, Los Altos, CA (US); James M Janky, Los Altos, CA (US)

(72) Inventors: Morrison Ulman, Los Altos, CA (US); James M Janky, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 213 days.

(21) Appl. No.: 13/749,587

(22) Filed: Jan. 24, 2013

(65) Prior Publication Data

US 2013/0217439 A1 Aug. 22, 2013

Related U.S. Application Data

(60) Provisional application No. 61/601,371, filed on Feb. 21, 2012.

(51) Int. Cl.
*G01N 21/00* (2006.01)
*G06T 7/00* (2006.01)
*H04M 1/02* (2006.01)
*H04N 5/33* (2006.01)
*H04N 5/225* (2006.01)

(52) U.S. Cl.
CPC ........... *G06T 7/0022* (2013.01); *H04M 1/0264* (2013.01); *G06T 7/0012* (2013.01); *H04N 5/332* (2013.01); *H04N 5/225* (2013.01); *H04M 2250/52* (2013.01); *G06T 2207/10048* (2013.01)
USPC ............................... 356/73; 356/51; 356/419

(58) Field of Classification Search
CPC ............... G06T 7/0022; G06T 7/0012; G06T 2207/10048; G06T 2207/10036; H04N 5/332; H04M 1/0264; H04M 5/225; H04M 2250/52; G06K 9/0063; G06K 9/00657; G01N 21/31; A01B 79/005; A61B 5/0059
USPC ............ 356/445, 448, 416, 417, 419, 425, 51
See application file for complete search history.

(56) References Cited

U.S. PATENT DOCUMENTS

| | | | | |
|---|---|---|---|---|
| 5,555,464 | A | * | 9/1996 | Hatlestad ...................... 348/266 |
| 5,621,460 | A | * | 4/1997 | Hatlestad et al. ............. 348/265 |
| 2004/0065834 | A1 | * | 4/2004 | Stone et al. ................. 250/341.8 |
| 2005/0098713 | A1 | * | 5/2005 | Holland ........................ 250/221 |
| 2010/0014096 | A1 | * | 1/2010 | Alameh ........................ 356/484 |
| 2010/0324830 | A1 | * | 12/2010 | Solie et al. ...................... 702/19 |
| 2011/0101239 | A1 | * | 5/2011 | Woodhouse et al. ....... 250/458.1 |

FOREIGN PATENT DOCUMENTS

DE WO2011015598 * 10/2011 ............. G01N 21/31

OTHER PUBLICATIONS

Madeline Fisher, "Precision ag in the developing world", CSA News, p. 4, Feb. 2012 (Crop Science Society of America, Soil Science Society of America, American Society of Agronomy).
Zafar Iqbal and Daniel Filippini, "Spectral Fingerprinting on a Standard Mobile Phone", J. Sensors, v. 2010, article ID 381796, 2010 (Hindawi Publishing Corporation).

* cited by examiner

Primary Examiner — Tarifur Chowdhury
Assistant Examiner — Michael P Lapage
(74) Attorney, Agent, or Firm — NUPAT, LLC

(57) ABSTRACT

Apparatus and techniques for measuring and managing plant growth with cell phones or similar devices are described.

13 Claims, 7 Drawing Sheets

| phone | either | server |
|---|---|---|
| record: image, position, time | calculate NDVI from images | weather, daylight spectra information |
| | database of NDVI, position, time | database of N-rich NDVI measurements |
| | fertilizer prescriptions | database of interpolated/fit N-rich NDVI |

CELL PHONE NDVI SENSOR

TECHNICAL FIELD

The disclosure is generally related to portable apparatus and methods for agricultural monitoring.

BACKGROUND

In agriculturally advanced countries the days of farmers planting crops, spreading fertilizer, and then hoping for the best until harvest time, are long gone. Nowadays farming is akin to managing a precision biochemical factory and plants are carefully monitored to maximize their growth. Fertilizer application is done according to specific algorithms that lead to high crop yield.

Precision fertilizer application saves money and protects the environment. Excess fertilizer leaches into the air, soil and water and pollutes lakes, rivers and aquifers. Nitrogen fertilizers can create massive algae blooms in the ocean that are fed by excess nutrient runoff. When algae populations get too large, they die and their natural decomposition depletes the water of oxygen leading to fish suffocation and death.

Farmers try to apply the optimum amount of fertilizer to get maximum possible growth from plants. Too much fertilizer leads to waste; however, too little fertilizer lowers crop yield unnecessarily. A basic strategy for finding the optimum fertilizer application rate begins with applying an excess of fertilizer to a small section of a field. In this "N-rich strip" plants are not limited by lack of fertilizer. During the growing season the progress of plants in the field is compared to that of plants in the N-rich strip. The difference in growth rates is used to estimate how much fertilizer to put on the field.

Plant growth rate is estimated by using optical sensors to measure Normalized Difference Vegetative Index (NDVI). NDVI is based on measurements of plant reflectivity at different wavelengths:

$$NDVI = \frac{r_{NIR} - r_{VIS}}{r_{NIR} + r_{VIS}}$$

where $r_{NIR}$ is infrared (e.g. 780 nm) reflectivity and $r_{VIS}$ red (e.g. 660 nm) reflectivity. Vigorous plants absorb red and reflect infrared, leading to high NDVI readings.

NDVI can be measured on-the-fly by arrays of sensors mounted to a fertilizer spray truck. Combined with variable rate sprayers, this leads to fertilizer application rates customized over areas as small as a few square meters. Such systems are routinely used on large farms in agriculturally advanced countries. These systems are expensive, however, and have not yet been introduced in less agriculturally developed regions and are also not affordable for small research projects.

What are needed are easier, cheaper systems for estimating optimum fertilizer rates. These systems should serve the needs of farmers who are just beginning to adopt precision farming techniques. These systems should also be appropriate, from performance and cost points of view, for training and research purposes.

DETAILED DESCRIPTION

Introduction

Figure 1A:
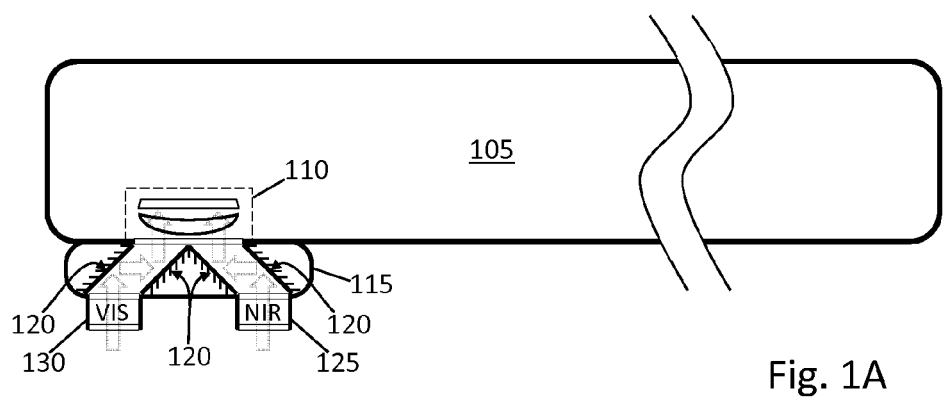
FIGS. 1A-1F show devices for capturing images at two different wavelengths simultaneously with a cell phone camera.

Cell phones are nearly ubiquitous. More people have them than almost any other item, including basics such as shoes. There will soon be more cell phones than people on earth. Cell phones also provide much more than voice communications capabilities. Current phones have significant digital processing and data communications capability, and include sensor suites with cameras, position sensors and more. The next generation will undoubtedly be even more sophisticated. "Smart" phones are common even in developing countries where people use them for health services and banking.

Significantly, for purposes of agricultural monitoring, cell phone cameras can be used to measure plant reflectance, compute NDVI, and store data tagged with the location and time that it was collected. Techniques for using cell phones in agriculture and devices that enable cell phones to act as NDVI sensors are described in detail below. Throughout this application the term "cell phone" refers not only to handheld devices capable of communication over cellular telephone networks, but also to tablet computers and personal digital assistants that may use other wireless communication links. Similarly, "NDVI" refers not only to normalized difference vegetative index, but also to any other similar indices based on optical measurements of plant reflectivity.

NDVI with Cell Phone Camera

A cell phone can be used to measure NDVI of a plant in a field by using the cell phone's camera to photograph the plant at different wavelengths. An image of the plant at visible wavelengths may be compared to an image of the plant at near-infrared wavelengths. The difference in image intensities divided by the sum of the image intensities leads directly to NDVI.

Considered in more detail, measuring NDVI using a cell phone includes illuminating a plant, capturing images of it at visible and near-infrared wavelengths, and processing the images. The most convenient illumination source is daylight from the sun. The spectrum of daylight must be taken into account, however. The intensity of daylight at 780 nm is about 75% of that at 660 nm, for instance.

Calibrating the spectrum of daylight illumination may be done in any of several ways. The simplest method is to use an assumed average spectrum shape. Alternatively one may take a photograph of the sky or of a white reference reflector and measure the intensity of light at wavelengths of interest. Still another possibility is to use a model of the daylight spectrum versus time of day, latitude, weather, and/or other factors. Such a model may account for enhanced red and reduced blue intensity when the sun is low in the sky, for example.

Images of a plant may be captured using a cell phone camera with spectral filters to select visible and near-infrared wavelengths. Accurate intensity measurements require knowledge of the camera's unfiltered spectral response and the transmission characteristics of the filters. Typical CCD cameras' peak sensitivity is around 580 nm while CMOS cameras' peak sensitivity is at longer wavelengths. Interference filters may be selected for specific bandpass wavelength, bandwidth and peak transmission characteristics.

Once the illumination intensity and camera sensitivity are established for visible (e.g. 660 nm) and near-infrared (e.g. 780 nm) light, images captured at those wavelengths may be processed with image analysis software. An example of basic processing is finding the average intensity in images of a plant taken at different wavelengths. These averages may then be used to compute NDVI. Alternatively, median intensity or a selected percentile of intensity may be used. Image recognition software may also be used to distinguish plants from dirt or to match parts of non-simultaneous images of a plant where the plant may appear in slightly different positions.

Figure 1B:
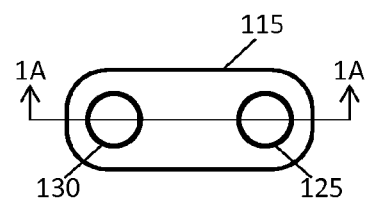

FIGS. 1A and 1B show a device for capturing images at two different wavelengths simultaneously with a cell phone camera. FIG. 1A is a cross-sectional view showing cell phone 105, cell phone camera 110, and image splitter 115. Mirrors 120 in image splitter 115 direct light passing through bandpass filters 125 and 130 to camera 110. Filter 125 is a bandpass filter with a center wavelength in the visible region of the spectrum while filter 120 is a bandpass filter with a center wavelength in the near-infrared region of the spectrum. Filters 125 and 130 may be optical interference filters, for example. FIG. 1B is another view of image splitter 115 that shows filters 125 and 130. Image splitter 115 causes camera 110 to see a split image. When the camera and image splitter are pointed at a plant, for example, two images of the plant appear side by side on the camera's image sensor.

Figure 1C:
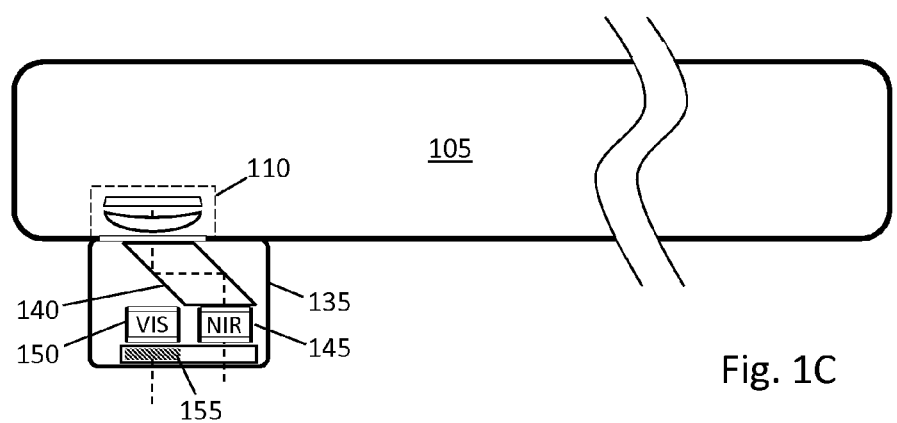
Figure 1D:
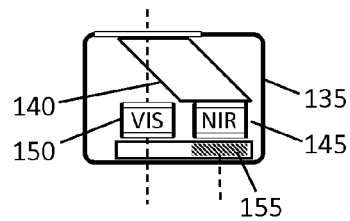

FIGS. 1C-1F show alternative devices for capturing images at two different wavelengths with a cell phone camera. The devices of FIGS. 1C-1F allow sequential, rather than simultaneous, capture of visible and near-infrared images. FIG. 1C is a cross-sectional view showing cell phone 105, cell phone camera 110, and filter housing 135. An optical rhomb 140 allows light from either near-infrared bandpass filter 145 or visible bandpass filter 150 to reach camera 110 depending upon the position of shutter 155. In FIG. 1C shutter 155 blocks light from passing through filter 150; light passing through filter 145 is directed to camera 110 by rhomb 140. In FIG. 1D shutter 155 blocks light from passing through filter 145; light passing through filter 150 also passes through rhomb 140 before arriving at camera 110. A user may therefore select visible or near-infrared image capture by moving shutter 155.

Figure 1E:
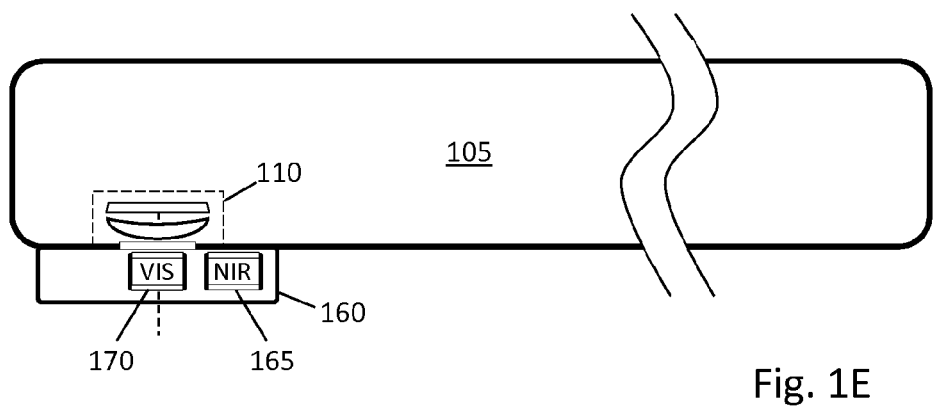
Figure 1F:
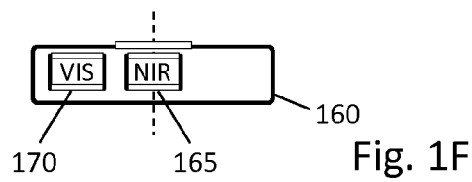

FIG. 1E is a cross-sectional view showing cell phone 105, cell phone camera 110, and filter housing 160. Near-infrared (165) and visible (170) bandpass filters are contained in the housing. The filters may be moved in the housing so that one or the other is placed in the path of light entering camera 110. For example, the filters may slide into position or may be mounted on a rotating wheel. A user may select visible or near-infrared image capture by moving the appropriate filter in front of camera 110.

Figure 2:
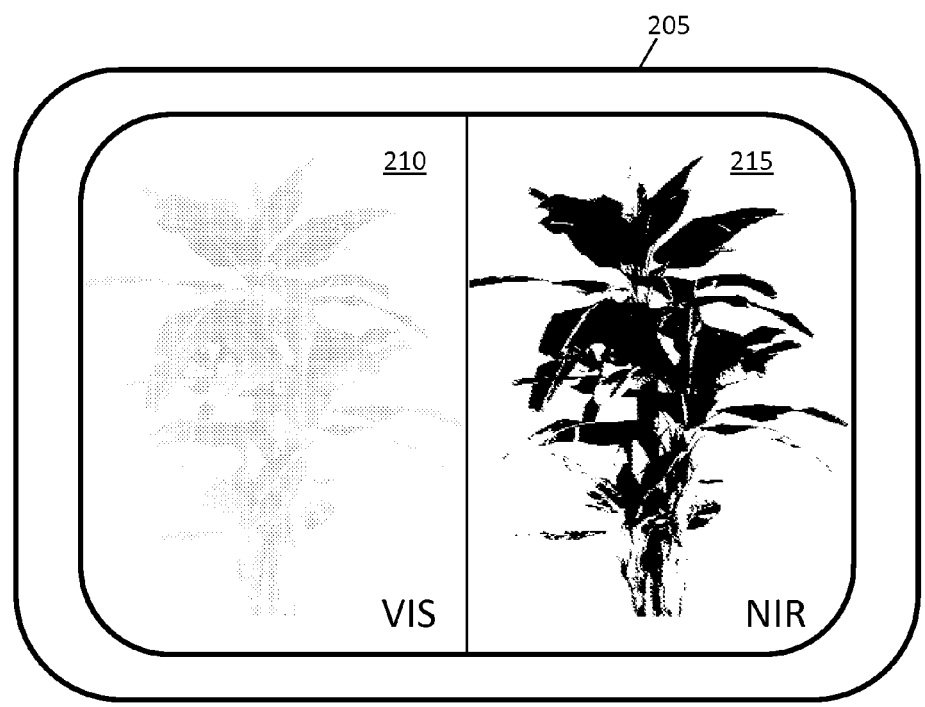
FIG. 2 is an example of a cell phone displaying images obtained at two different wavelengths.

FIG. 2 is an example of a cell phone displaying images obtained at two different wavelengths. In FIG. 2, cell phone 205 displays an image 210 of a plant as seen with visible light and an image 215 of the plant as seen with near-infrared light. If the cell phone is equipped with the image splitter of FIG. 1, the two images may be captured simultaneously. Alternatively, visible and near-infrared images of a plant may be obtained in succession by placing an appropriate bandpass filter in front of the cell phone camera for each image. When images are obtained in succession, rather than simultaneously, image analysis software may be used to match features in the images so that reflectivity data used to calculate NDVI are obtained from the same part of a plant.

Thus a cell phone may be used as an optical NDVI sensor using daylight illumination. It is necessary to consider the spectrum of the illuminating light, the transmission characteristics of bandpass filters used to record images at different wavelengths, and the spectral response of the cell phone camera. Properties of the filters and cell phone camera are readily available or easily measured. The spectrum of the illuminating light may be assumed (e.g. average sunlight spectrum at the earth's surface), modeled (e.g. tabulated for time of day and latitude), or measured directly (e.g. by recording images of a white reflector, i.e. one with a flat spectral response). Once the reflectivity of a plant at visible and near-infrared wavelengths has been measured, NDVI may be calculated using the formula given above. A smart cell phone, however, can do much more than measure NDVI. It may also be used to manage NDVI data and use it to create fertilizer prescriptions.

Interpretation and Management of NDVI Information

Smart cell phones include global navigational satellite system (GNSS) receivers. These are usually global positioning system (GPS) receivers, but may also receive other GNSS constellations. Smart cell phones also estimate position from cellular radio and wireless data network signals. Most often, satellite navigation, cellular radio and wireless data signals are used together to estimate position. All of these signals are also used to estimate time.

When a cell phone is used to measure NDVI, it may record not only plant images, but also the time and position of each NDVI measurement. These measurements may then be stored in a database of NDVI, position and time, and used to create NDVI maps of farm fields or larger areas. Such NDVI maps are useful to farmers as they permit visualization of plant growth potential. An NDVI map of a farm field can allow a farmer to understand quickly which parts of the field are growing better than others and where additional fertilizer might be helpful.

A cell phone may also store fertilizer prescription and farming practice algorithms in its memory. NDVI data may be used as an input to these algorithms to determine how best to manage a crop, e.g. add fertilizer, water, etc. Many algorithms are based on comparison of measured field NDVI with reference NDVI obtained from measurements of an N-rich strip. A cell phone can store reference NDVI readings from N-rich strips in its memory for use with farming practice algorithms.

Figure 3:
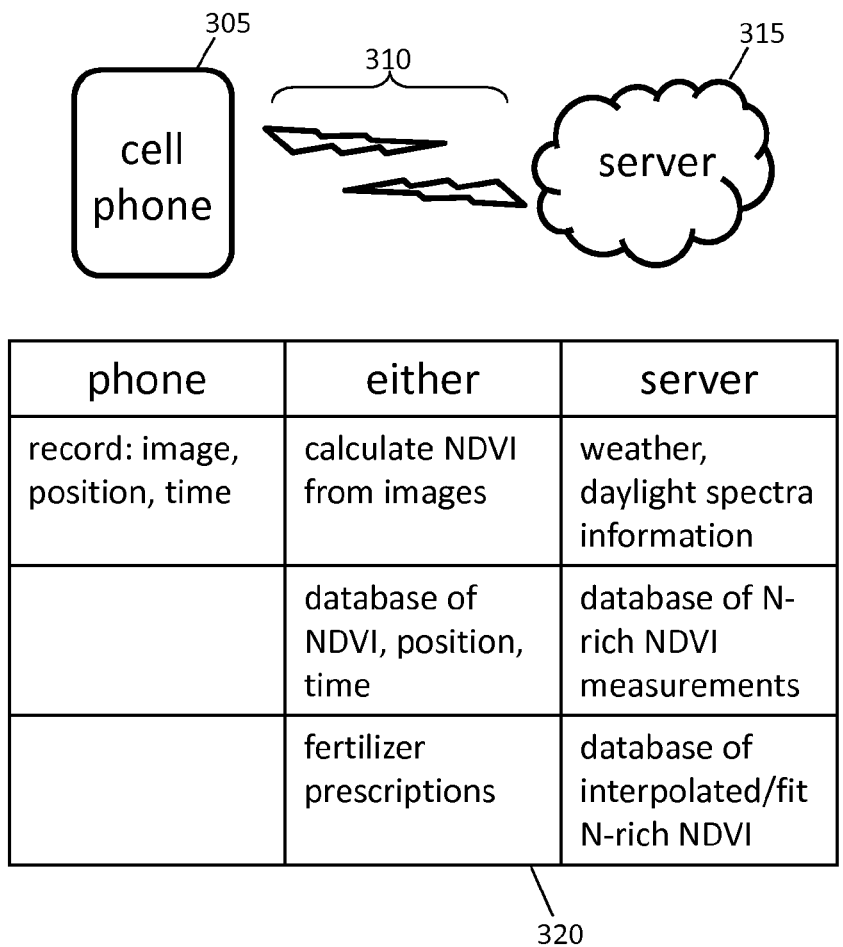
FIG. 3 includes a diagram of a cell phone communicating with a server and an example table of actions that may be performed by the phone, the server or either one.

FIG. 3 includes a diagram of a cell phone communicating with a server and an example table of actions that may be performed by the phone, the server or either one. In FIG. 3, cell phone 305 communicates with server 315 via wireless link 310. Table 320 outlines actions that may be performed on the phone or the server. In table 320, actions in the "either" column may be performed either on a phone or a server. Actions in the "server" column are more likely to be performed on a server, but may also take place on a phone. (Thus, actions listed in the "server" column are not prevented from being done by a phone.)

Plant images, and positions and time of image acquisition are recorded on a phone. Almost all other operations associated with using cell phones as NDVI measurement and farm management tools may be performed on a server, if desired. For example, calculating NDVI from visible and near-infrared images, maintaining a database of NDVI, position and time, and storing and using fertilizer prescriptions may all be done either on a phone or on a server in communication with the phone via wireless link.

Other operations that may be performed on a server or phone include providing: current, forecast or historical weather data; information on daylight spectra under different conditions including time of day, latitude and weather; maintaining a database of N-rich reference NDVI measurements; and, maintaining a database of interpolated or fit N-rich reference NDVI measurements.

Figure 4:
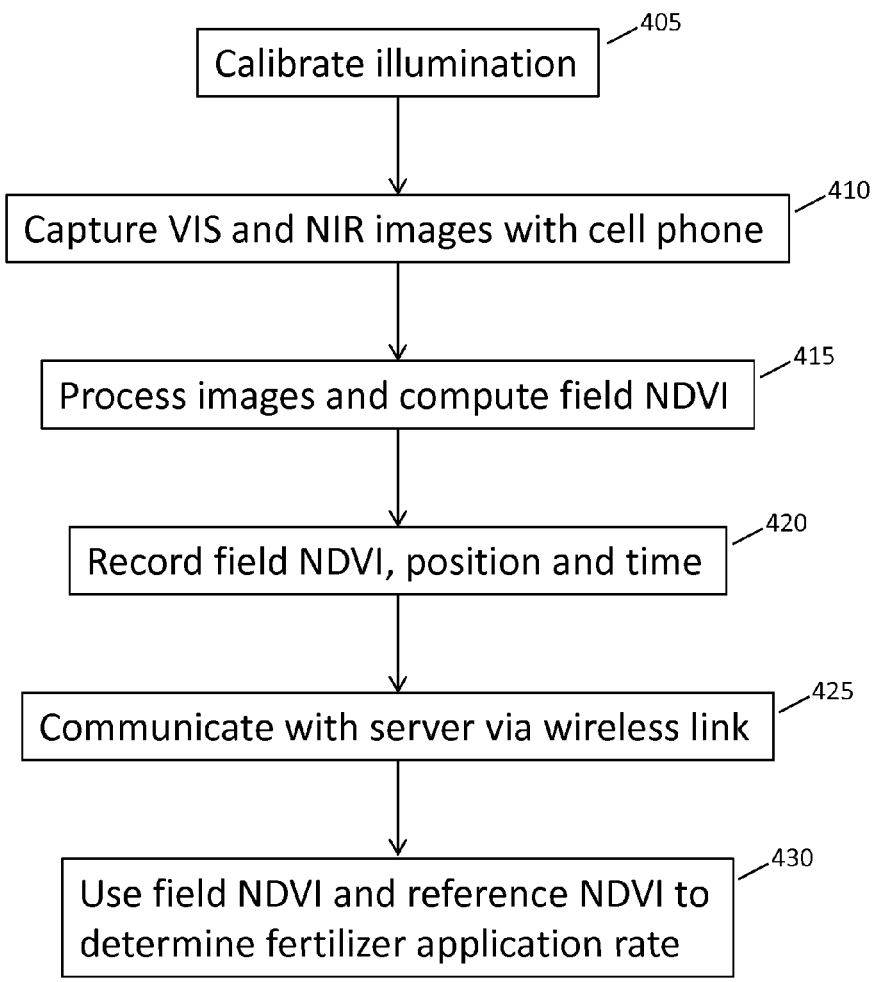
FIG. 4 is a flow chart for a method of obtaining and using NDVI information.

FIG. 4 is a flow chart for a method of obtaining and using NDVI information. The steps in FIG. 4 are presented in outline form; each one comprises many possible details and variations. The steps are also not required to be performed in the order presented. Finally, all of the steps are optional depending on the overall task to be accomplished.

In FIG. 4, step 405 is calibrating the illumination source. Step 410 is capturing visible and near-infrared images with a cell phone camera. Step 415 is processing images and computing field NDVI from them. Step 420 is recording field NDVI, position and time. Step 425 is communicating with a server via a wireless link such as a cellular telephone connection or a wireless data network. Finally, step 430 is using field NDVI and reference NDVI as inputs to an algorithm to determine fertilizer application rate.

When field NDVI information is available, relative fertilizer recommendations may be made: e.g. put more fertilizer on one part of a field and less on another part. When field and reference (N-rich) NDVI are available, however, precise fertilizer application rate prescriptions are possible: e.g. apply a specific number of kg/ha at a specific location.

Fertilizer prescriptions are more accurate when reference NDVI is obtained from plants near the field plants to be fertilized. Accuracy is degraded as the distance to the reference N-rich strip increases. Myriad factors affect growing conditions, however, so quantitative evaluation of how prescription accuracy depends on distance to the reference NDVI source is elusive.

Ideally (and unrealistically) every plant in a field has a reference N-rich strip right next to it. In practice a reference N-rich strip is planted along an edge, or perhaps in a strip down the center, of a field. In agriculturally advanced areas a single field may encompass hundreds of acres while an entire farm in developing areas may only cover twenty acres. Both types of farms benefit from reference NDVI information that is obtained as locally as possible.

Instead of using one N-rich strip to serve a field, reference NDVI information may be obtained from readings of N-rich plants in several locations. Reference NDVI may then be interpolated for positions between N-rich plants. Reference NDVI may also be fit to a function of position to form a virtual reference NDVI surface. Estimated reference NDVI may then be obtained for any location near the N-rich plants.

Figure 5A:
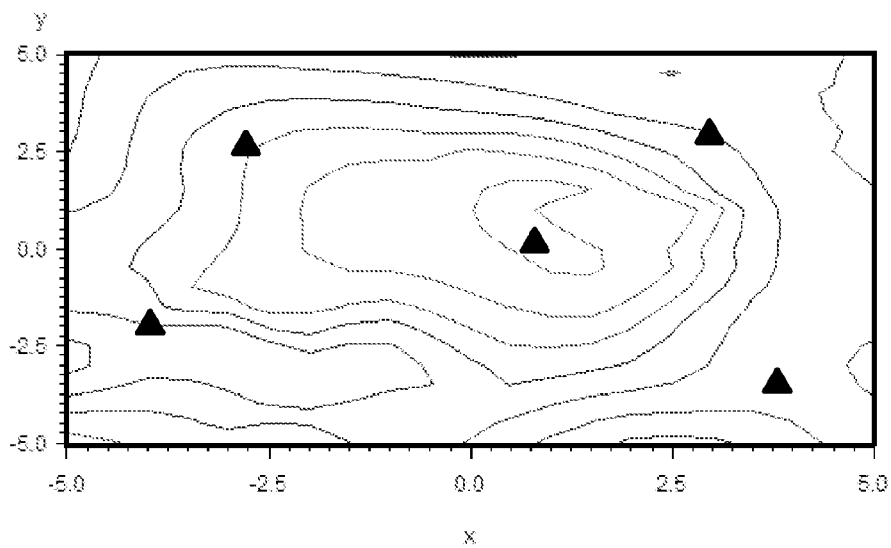
FIGS. 5A and 5B illustrate concepts related to synthesis of virtual reference NDVI information.
Figure 5B:
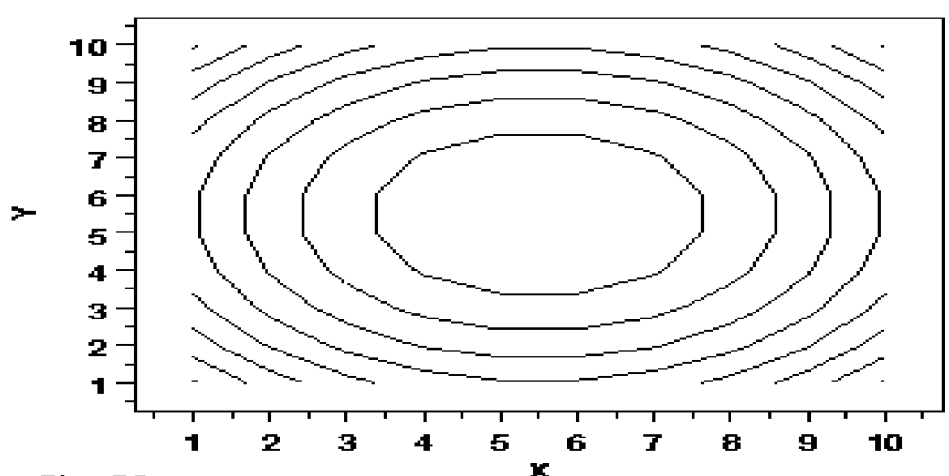

FIGS. 5A and 5B illustrate concepts related to synthesis of virtual reference NDVI information. FIG. 5A shows a region of arable land. The region could be a single farm field or an area encompassing many farm fields. Black triangles in FIG. 5A show locations where reference NDVI information has been obtained from N-rich plants. These may be traditional N-rich strips or any shape, small N-rich areas. FIG. 5B shows the same region of FIG. 5A. In FIG. 5B, however, contour lines represent a fit of reference NDVI data obtained at the locations marked by black triangles in FIG. 5A. As an example, the fit may be to a paraboloid; however any smooth function may be used. When reference NDVI data is available for two sides of a field, for example, a synthesized virtual reference NDVI surface may be a plane sloping in one direction.

Reference NDVI, position and time data may be collected in a database and stored on a server. The server may perform fitting and/or interpolation of the data and provide virtual reference NDVI data for any location near the measured locations. The server may also fit and/or interpolate data taken at different times by using a plant growth model and weather data.

Conclusion

A cell phone may be used to capture images of plants and compute NDVI from them. The phone may also be used alone, on in conjunction with a server, to manage NDVI data and create customized fertilizer prescriptions. Reference NDVI measurements may be interpolated or fit to smooth functions to create virtual reference NDVI surfaces. Virtual reference NDVI provides an estimate of reference NDVI at any location near measured reference N-rich areas. In agriculturally advanced regions, virtual reference NDVI may be used to make precision farming techniques even more precise. In less advanced regions, virtual reference NDVI may be the only source of reference information available for small farms.

Smart phones have processing power and memory that were unthinkable only a few years ago and phones' capabilities will continue to grow. As such, a phone may be capable of performing all NDVI data capture and management functions on its own. In many situations, however, the phone also benefits from a wireless connection to a server that may provide advanced services such as pinpoint weather and daylight spectral information.

A smart phone, possibly in concert with a server, can capture NDVI and related indices based on optical measurements. The phone provides farming practice recommendations including fertilizer relative or absolute rate estimates, watering schedules, etc.

An example of a cell phone NDVI measurement illustrates some of the concepts described above. First, a picture is taken of a plant using a cell phone camera and a near-infrared filter such as an optical interference filter centered around 780 nm. Next, a picture is taken of the same plant using a visible filter such as an optical interference filter centered around 660 nm. If an image splitter such as that of FIG. 1A is available, then the two pictures may be taken simultaneously.

Next, the pixel intensity in a representative part of the images of the plant is recorded. Optionally, an average, median, peak, or specific percentile of the pixel intensity may be recorded. As an example, assume that the near-infrared intensity is 15 and the visible intensity is 10 in arbitrary units. Any units may be used as long as they are consistent.

Next, suppose that the filters transmit 50% of the incident light at their respective center wavelengths. Filter transmission specs may be obtained from the filter manufacturer or independently measured. The pixel intensity readings are now adjusted to account for filter transmission characteristics: near-infrared: 15/50%=30; visible: 10/50%=20. Of course, this step is not necessary unless the filter transmission coefficients are different.

Next, take into account that the incident intensity of daylight at 780 nm is only 75% of that at 660 nm. Information on the daylight spectrum may be assumed, looked up, based on time and position, or measured. Adjusting the near-infrared intensity for the daylight spectrum leads to: near-infrared: 30/75%=40.

Next, take into account that the camera sensitivity at 780 nm is only 50% of that at 660 nm. Information on camera sensitivity may be assumed based on type of camera (e.g. CCD, CMOS) or looked up based on manufacturer's specs. Adjusting the near-infrared intensity for camera sensitivity: near-infrared: 40/50%=80.

NDVI may now be computed according to NDVI=(NIR−VIS)/(NIR+VIS)=(80−20)/(80+20)=0.6. A cell phone may automatically perform this calculation as well as all of the calibration steps listed above, and record the NDVI reading, along with the position and time at which it was obtained, in memory.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

In various embodiments, the methods described above, such as the method of FIG. 4, are carried out by a processor under the control of computer-readable and computer-executable instructions. The computer-readable and computer-executable instructions reside, for example, in computer useable/readable storage media such as volatile memory, non-volatile memory, or in/on other well known computer-readable storage media. The computer-readable and computer-executable instructions, which may reside on computer useable/readable storage media, are used to control or operate in conjunction with, for example, cell phone 205 of FIG. 2. Although specific steps are disclosed in FIG. 4, such steps are examples. That is, embodiments are well suited to performing various other steps or variations of the steps recited. It is appreciated that the steps in FIG. 4 may be performed in an order different than presented, and that not all of the steps in FIG. 4 may be performed.

What is claimed is:

1. A method for measuring plant growth comprising:
    capturing a first image of a plant at a first wavelength and a second image of the plant at a second wavelength with a camera in a cell phone;
    processing the first and second images to compute a field vegetation index using a microprocessor in the cell phone;
    determining the position and time that the images were acquired using a position sensor and clock in the cell phone; and,
    recording the field vegetation index, position and time in memory in the cell phone.

2. The method of claim 1 further comprising:
    calibrating the spectrum of ambient light that illuminates the plant.

3. The method of claim 2 wherein calibrating is accomplished by use of a lookup table.

4. The method of claim 2 wherein calibrating is based on the position and time that the images were acquired.

5. The method of claim 4 wherein calibrating is further based on weather conditions at the position and time that the images were acquired.

6. The method of claim 2 wherein calibrating is accomplished by acquiring an image of a white reflector.

7. The method of claim 1 further comprising:
    using the cell phone to communicate with a server via a wireless link to obtain an estimated reference vegetation index for the position and time at which the images were acquired.

8. The method of claim 7 further comprising:
    using the cell phone to communicate with a server via a wireless link to obtain an estimated optimal fertilizer application rate based on the field vegetation index and the estimated reference vegetation index.

9. The method of claim 1 wherein the first and second images of the plant are obtained simultaneously.

10. The method of claim 1 wherein the first wavelength is about 660 nm and the second wavelength is about 780 nm.

11. The method of claim 1 wherein the vegetation index is a normalized difference vegetative index.

12. The method of claim 1 wherein the position sensor is a global navigational satellite system receiver.

13. The method of claim 12 wherein the global navigational satellite system receiver is a global positioning system receiver.

* * * * *